Dec. 1, 1964    R. E. DIENER    3,159,065
MACHINE HAVING RELATIVELY MOVABLE TOOL AND WORK SUPPORTS
Filed Feb. 20, 1961    5 Sheets-Sheet 1

INVENTOR.
ROBERT E. DIENER
BY Hudson, Boughton,
Williams, David & Hoffmann
ATTORNEYS INVENTOR.
ROBERT E. DIENER
BY Hudson, Boughton,
Williams, David & Hoffmann
ATTORNEYS

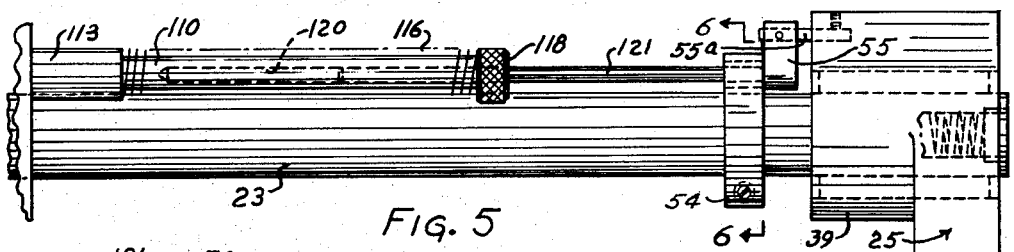
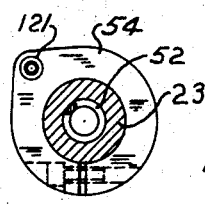
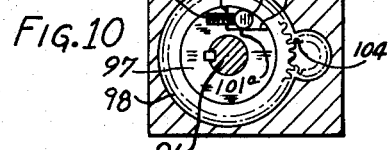
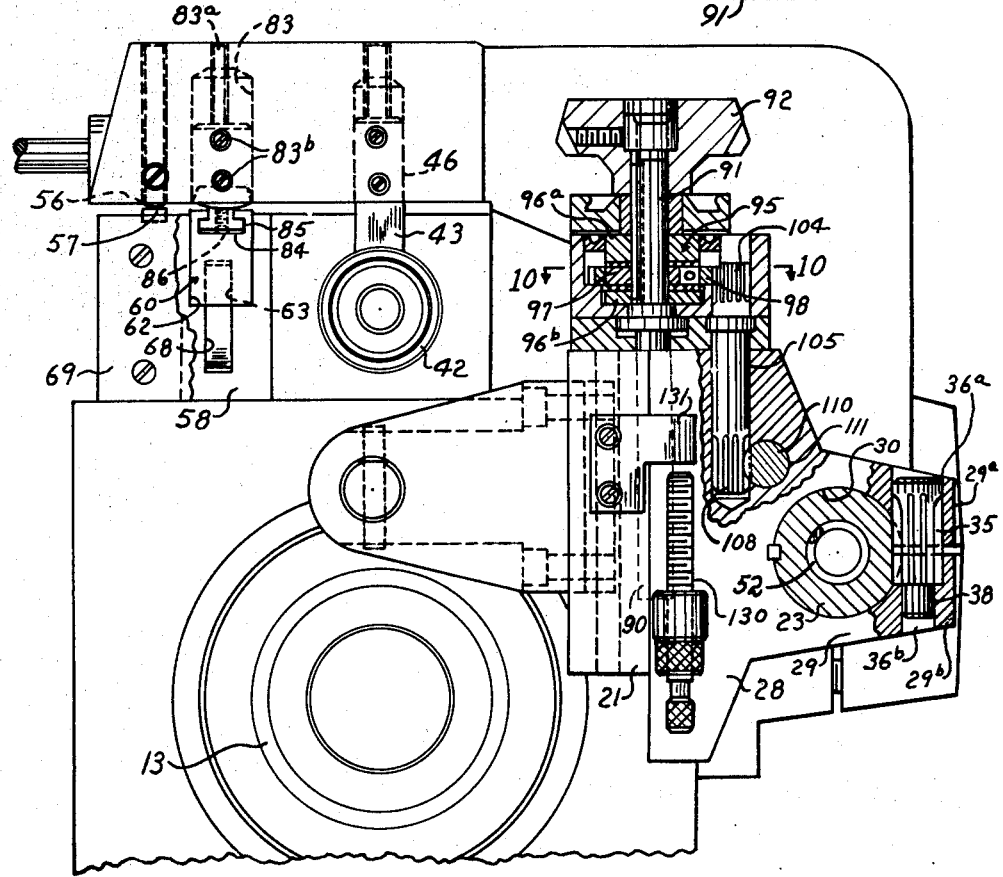

INVENTOR.
ROBERT E. DIENER

United States Patent Office 3,159,065
Patented Dec. 1, 1964

3,159,065
MACHINE HAVING RELATIVELY MOVABLE
TOOL AND WORK SUPPORTS
Robert E. Diener, Shaker Heights, Ohio, assignor to The Warner & Swasey Company, Cleveland, Ohio, a corporation of Ohio
Filed Feb. 20, 1961, Ser. No. 90,431
13 Claims. (Cl. 82—5.5)

The present invention relates to a machine wherein tool and work support members are relatively movable along a first path to and from a working position and when in working position are relatively moved in a direction angularly related to the first path to effect a work pass, and wherein the support members are relatively moved from their working position at the end of the work pass and returned to their relative position at the start of the work pass preparatory to making a second work pass, and, more particularly, to a machine for forming threads on a rotating workpiece.

In the type of machine to which the present invention relates a carrier member, which may be a carrier for a thread-forming tool, and a support member are relatively moved to and from a working position by relative reciprocatory movement along a first path and when in working position, are relatively moved in a first direction angularly related to the first path to effect a work pass, a thread-forming pass in the case of a carrier member mounting a threading tool, the members being relatively moved from their working position at the end of the work pass and returned while in a nonworking position to a relative position at the start of the work pass preparatory to effecting a second work pass, and the relative movement of the members into and out of working position effecting the relative movement of power transmission elements that form a part of the drive for relatively moving the members in the first direction to engage the drive when the members are relatively moved to their working position and to disconnect the drive when the members are relatively moved from their working position to a nonworking position.

An important object of the present invention is to provide a new and an improved machine of the type described wherein the carrier member and support member can be relatively moved from their working position during the work pass, and wherein they are automatically moved out of their working position after a predetermined movement through a work pass to effect both the relative movement of the carrier and support members from their relative working position to a nonworking position and the disconnection of the drive for advancing the carrier, and wherein the relative movement to the nonworking position is effected by a knock-off member which engages the one member and applies a force to the other member to relatively move the members to their nonworking position.

Another object of the present invention is to provide a machine as in the preceding object wherein the knock-off member is releasably latched in an inactive position by latch means which is released in response to relative movement of the members in the work pass to release the knock-off member for movement to effect the relative movement of the support and carrier members from their working position.

A still further object of the present invention is to provide a new and an improved machine wherein the knock-off member functions as a guide and support for maintaining the carrier member and support member in a nonworking position during the return stroke.

Yet another object of the present invention is to provide a machine of the type described wherein the carrier member is moved to effect the relative movement of the members to and from working position and through a work pass and the carrier member mounts a tool slide which is to be advanced each time the carrier member is returned to the start of the workpass and wherein the advancement of the tool is effected by the axial reciprocation of a rod which, during the return movement, engages a stationary abutment to produce relative movement between the carrier member and the rod during the latter portion of the return of the carrier, with the rod being urged toward engagement with the stationary abutment.

Still another object of the present invention is to provide a new and an improved mechanism for advancing a slide an incremental amount, in which mechanism the slide is advanced in response to the lengthwise reciprocation of a rod or bar.

A further object of the present invention is to provide a new and an improved, simple and economical mechanism for rapidly reciprocating a tool support through a work pass of predetermined length, moving the tool support to a nonworking position and returning the tool support to the beginning of the work pass, and for advancing the tool in preparation to the initiation of the second work pass, with the support being particularly adaptable to be mounted in an overhead position with respect to a workpiece to be operated upon.

Further objects and advantages of the present invention will be apparent from the following detailed description thereof made with reference to the accompanying drawings forming a part of the present specification and in which:

FIG. 1A is a fragmentary plan view of a part of the machine shown in FIG. 1;

FIG. 5 is a front elevational view of a portion of FIG. 1 looking approximately along line 5—5 of FIG. 1;

FIG. 6 is a sectional view taken approximately along line 6—6 of FIG. 5;

FIG. 7 is a sectional view taken approximately along line 7—7 of FIG. 2 with portions thereof cut away;

FIG. 10 is a fragmentary detail sectional view taken approximately along line 10—10 of FIG. 7.

Figure 1:
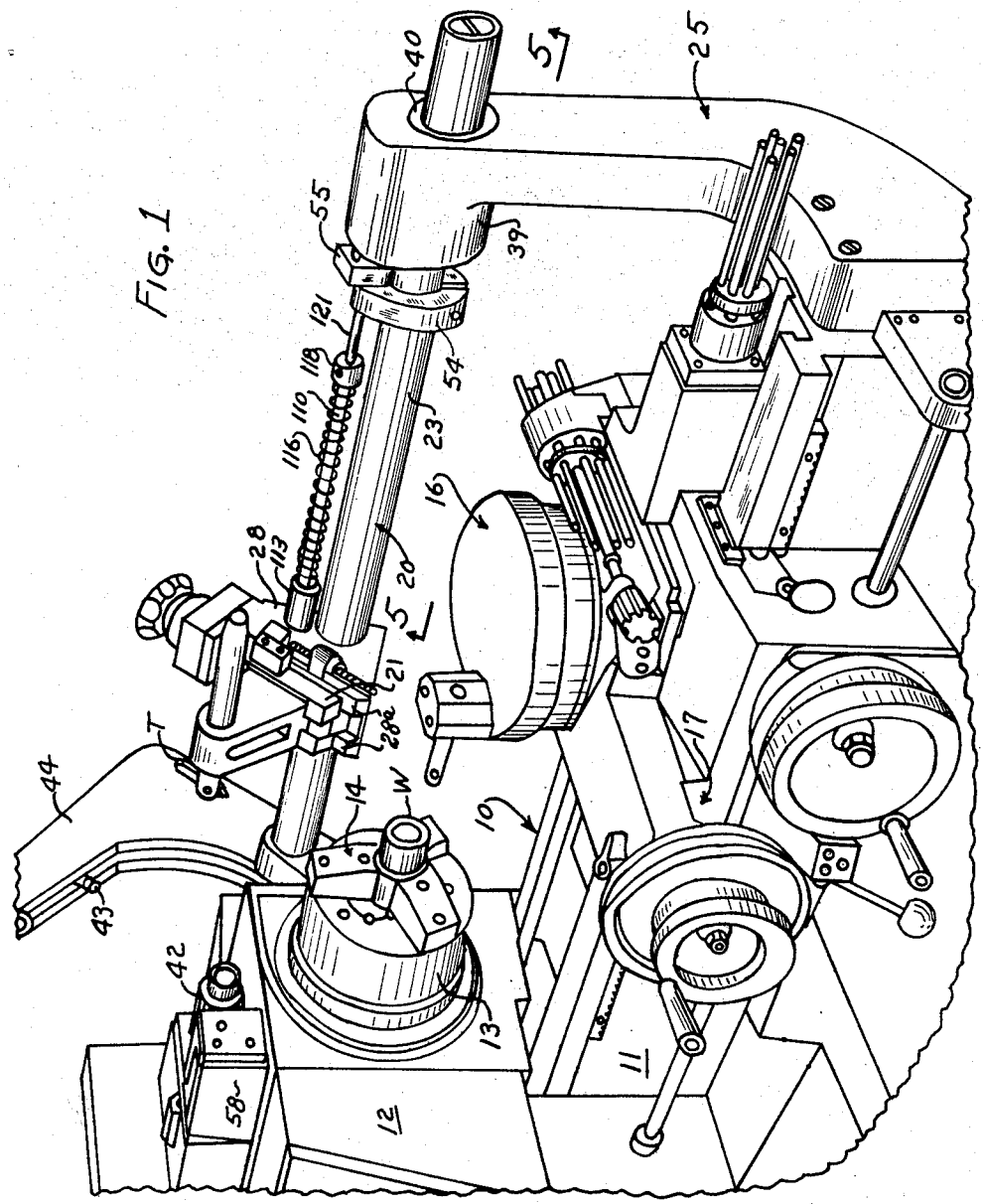
FIG. 1 is a fragmentary perspective view of a lathe embodying the present invention.

The present invention relates to a machine wherein first and second support members are relatively reciprocable along a first path to and from a working position and when in a working position, are relatively moved through a work pass and at the end of the work pass are relatively moved from their working position to a nonworking position and returned in a relative nonworking position to the beginning of the work pass, with the movement of the carrier to and from working position effecting the operation of and the stopping of the drive for relatively moving the support members through a work pass. Further, the invention also relates to the type of machine just described wherein one of the support members mounts a slide which is to be advanced an incremental amount for successive work passes.

In accordance with one feature of the present invention, one of the support members is engaged by a knock-off member which is operable when the support members reach the end of their work pass to apply a force tending to move the support members to a nonworking position to both position the support members for return movement and to disconnect the drive for effecting the relative movement of the support members through a work stroke.

In accordance with another feature of the present invention, the knock-off member is spring biased to move in a direction for effecting the relative movement of the support members from a working position and is released for movement in response to the relative movement of the support members to the end of the work pass, the knock-off member preferably being held in an inactive position against the bias thereon by releasable latch mechanism which is engaged and operated by an abutment mounted on one of the members.

In accordance with still another feature of the present invention, the support members are automatically returned to their position at the start of a work pass whenever the support members are relatively moved to a nonworking position with the relative return movement of the support members effecting the lengthwise movement of a rod slidably mounted on the one support member to effect the incremental advance of a slide for mounting a tool on the support member. In accordance with the invention, the mechanism for advancing the slide includes the rod which is spring biased to a position extending toward abutment means toward which the rod moves on the return of the members so that the rod on the return pass engages the abutment means and effects relative movement of the rod and the support member mounting the rod during the latter portion of the return stroke of the support members and this movement of the rod is utilized to effect the incremental advance of the tool slide, the amount of the incremental advance being determined by adjustable means which controls the relationship of the rod to the abutment means. In the preferred and illustrated embodiment, the movement of the rod effects the rotation of an input element of a one-way clutch for driving mechanism for advancing the tool slide and the rotation of the input element of the one-way clutch is in a direction to effect a drive to the mechanism for advancing the tool slide when the rod is shifted on the return movement of the support members, the rod being returned during the work pass of the support members and the clutch providing idling movement between the rod and the tool advance mechanism.

While the present invention is susceptible of various constructions and modifications and of uses in various machines where it is desirable to relatively move support members through a work pass with the support members in a working position, to relatively move the support members to a nonworking position at the end of the work pass and return the support members to a relative position at the start of the work pass while in the nonworking position, it is particularly adaptable for use in a lathe wherein a threading tool is to be operated in the manner described to form a thread on a rotating workpiece, and the invention has been shown as embodied in such a lathe.

Referring to the drawings, FIG. 1 shows a lathe 10 having a bed 11 and a headstock 12, which is a work support member, at one end of the bed, the left-hand end as viewed in FIG. 1. The headstock 12 includes a spindle 13 which is supported for rotation in a horizontal axis and the outer end of the spindle is provided with a conventional chuck 14 for supporting a workpiece W on the axis of the spindle for rotation with the spindle. The illustrated lathe includes, for purposes of illustration, a cross-sliding turret 16 mounted on a carriage 17 which is supported on ways on the bed 11 for movement parallel to the axis of the spindle 13 to move a tool T for operating upon a workpiece W toward and away from the spindle.

The cross-sliding turret 16 and the carriage 17 do not form a part of the present invention and, therefore, will not be described in detail.

The spindle 13 may be rotated by a conventional drive located within the machine and since such drives are well known, the drive to the spindle has not been shown and will not be described in detail. The drive to the spindle may, however, be made to a sheave 18 (see FIG. 8) fixed to the spindle adjacent the left-hand end thereof and within the headstock 12.

Figure 9:
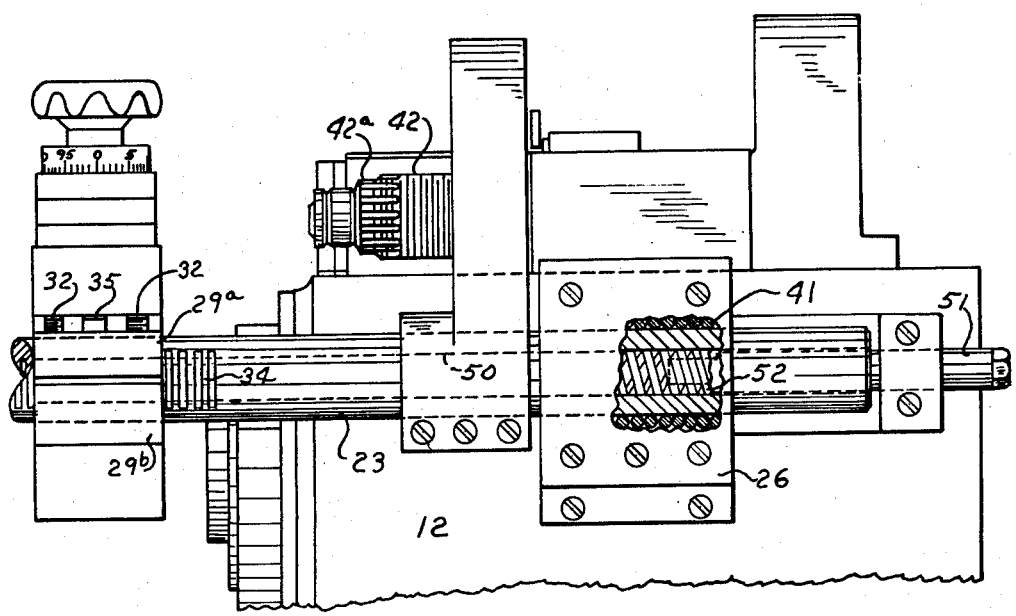
FIG. 9 is a rear elevational view of the portion of the machine shown in FIG. 2 with a part cut away.

The lathe 10 also includes a carrier 20, which is a tool support member, located at the top rear of the machine, as shown in FIG. 1, and which mounts a tool slide 21 for mounting a tool T adapted to cut threads on the workpiece W. The carrier 20 comprises a bar or shaft 23 extending parallel to the axis of the spindle 13 adjacent the top rear of the lathe 10. The bar 23 is supported for axial sliding movement by a support arm 25 rising upwardly from the bed 11 at the right-hand end thereof, as viewed in FIG. 1, and by a boss 26 secured to the rear side of the headstock 12 (see FIG. 9).

A block 28 is mounted on the bar 23 and has ways 28a thereon which support the tool slide 21 for movement in a direction extending transversely of the bar 23. The block 28 has a projecting portion 29 that has an opening 30 therein for receiving the bar 23, as is shown in FIG. 7, and the block 28 is slidably keyed to the bar. The projection 29 is split so that the opening 30 is defined by a pair of clamp arms 29a, 29b which may be drawn together by bolts 32 which pass through the clamp arm 29a and thread into the clamp arm 29b to clamp the block 28 to the bar 23 and hold the block against movement relative to the bar. By loosening the bolts 32, the clamping force is relaxed and the block 28 may be moved along the bar 23. The bar 23 has a rack 34 formed thereon for a portion of its length and a pinion 35 is rotatably supported by the projection 29 and meshes with the rack 34. The pinion 35 is disposed between the bolts 32 at the outer end of the projection 29 and is rotatably supported in an opening 36a in the clamp arm 29a and an opening 36b in the clamp arm 29b. The pinion 35 is formed with a wrench-receiving portion at its upper end, as viewed in FIG. 7, and a pilot pin portion 38 at its lower end, as viewed in FIG. 7. The pilot portion is received in a portion of the opening 36b which is of reduced diameter from the portion of the opening which receives the pinion 35. The position of the block 28 and, in turn, of the tool slide 21, relative to the bar 23 may be adjusted by loosening the screws 32, rotating the pinion 35 to move the block 28 along the bar 23 to the desired position and then tightening the screws 32 to clamp the block 28 to the bar.

The bar or shaft 23 is supported in a boss 39 at the end of the arm 25 and in the boss 26 by ball-bearing type bushings 40, 41, respectively, so that the bar 23 may be rotated, as well as moved axially. In FIG. 1, the bar 23 is shown in its position where the tool T is in its nonworking or inactive position and when the tool T is to be moved to its active position, the bar 23 is rotated to swing the tool T into working position, as is shown in FIG. 7.

When the tool is in working position, the bar 23 is moved axially to advance the tool through a work stroke to form, in the illustrated embodiment, a helical cut on the workpiece W. The bar 23 is slidable in the boss 26 and in the arm 25 to effect the movement of the tool T through the work pass.

The bar 23 is moved axially through the work pass by a lead screw 42 rotatably supported at the top of the headstock 12 and adapted to be engaged by a follower 43 to effect movement of the carrier 20 through its work pass. The follower 43 is mounted in an arm 44 having one end clamped to the bar 23 and extending upwardly from the bar along a path which curves toward the front of the machine. The arm 44 can be moved to a position wherein it extends over the lead screw 42, and the follower 43 is mounted in an opening 46 extending inwardly from the underside of the bar and the follower extends outwardly from the underside of the bar. The end of the arm 44 remote from the shaft 23 is provided with a handle 48 which may be used to swing the arm from an inactive position where the block 23 and the tool slide 21 are in an inactive position and the follower 43 disengaged from the lead screw 42, to a position where the follower 43 engages the lead screw 42 and the tool T is in a working position (see FIGS. 4 and 7). With the follower 43 engaged with the lead screw 42, rotation of the lead screw will cause the follower 43 to move to the left along the lead screw, as the latter is viewed in FIGS. 1 and 2, and the tool slide 21 to move toward the spindle along a line of movement parallel to the axis of the spindle to move the tool T through a work pass. The drive for advancing the carrier 20 may be disconnected at any time by simply moving the arm 44 upwardly to move the tool T out of working position and to disengage the follower 43 from the lead screw 42.

Figure 4:
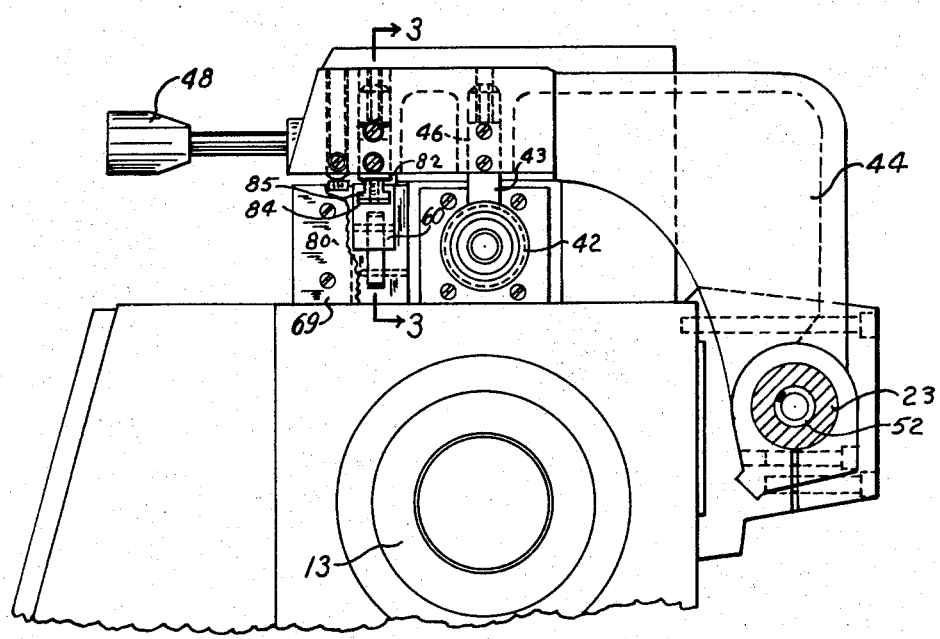
FIG. 4 is a fragmentary sectional view taken approximately along line 4—4 of FIG. 2 and looking in the direction of the arrows.

The bar 23 is biased in a clockwise direction, as it is viewed in FIGS. 4 and 7, to urge the arm 44 upwardly toward its inactive position shown in FIG. 1 where the follower 43 is disengaged from the lead screw 42 and the tool T is in an inactive position. The bar 23 has an axial opening 50 therethrough and the end portion thereof adjacent boss 26 receives a rod 51 that is fixed to the headstock 12 outwardly of the right-hand end of the bar 23, as viewed in FIG. 9, and which rod extends into the opening 50. The inner end of the rod 51 anchors the end of a torsion spring 52 disposed in the bore or opening 50, the spring 52 having its other end connected to the bar 23 at the opposite end of the bar so that the torsion spring 52 urges the bar in a counterclockwise direction, as the latter is viewed in FIG. 7. The spring 52 is also a compression spring which acts to urge the bar 23 to the right as viewed in FIG. 1, to the left as viewed in FIG. 9, and the spring opposes but yields to movement of the bar 23 by the lead screw 42.

A collar 54 is mounted on the bar 23 inwardly of the arm 25 and the spring 52 urges the bar 23 to the right until the collar 54 engages a stop block 55 swingably supported adjacent the inner side of the boss 39 to limit the movement of the carrier 20 to the right, as viewed in FIG. 1. The bar 23 and, in turn the carrier 20, may be moved to the left against the action of the spring 52 by engaging the follower 43 with the lead screw 42 but the carrier will be returned to its position where the collar 54 engages the stop block 55 whenever the arm 44 is moved upwardly to disengage the follower 43 and the lead screw 42. It can now be readily perceived that the movement of the tool T to working position and the movement of the tool slide 21 through a work pass may be initiated by swinging the arm 44 downwardly to move the follower 43 into engagement with the lead screw 42 and that the lead screw and follower will move the carrier 20 through a work pass in opposition to the spring 52 as long as the follower 43 remains in engagement with the lead screw 42 and the latter is rotated.

If, however, the arm 44 is moved upwardly to disengage the follower 43 from the lead screw 42, the spring 52 will act to return the bar 23 to a position where the collar 54 is in engagement with the stop block 55 to reposition the carrier at the beginning of the work pass.

In the preferred and illustrated embodiment, the weight of the arm 44 and of the overhang of the slide 21 and the tool T is such that the follower 43 is biased toward engagement with the lead screw 42 even though the spring 52 urges the bar 23 in a direction to move the follower away from the screw. In other words, the spring 52 acts primarily as a counterbalancing spring to permit a light force to operate to lift the follower 43 from the lead screw 42, although it could operate in an overcenter manner if desired.

When the arm 44 is in its active position where the follower 43 is in engagement with the lead screw 42 and the tool T is in a working position, the arm 44 and, in turn, the tool carrier 20 is limited against movement in a counterclockwise direction, as viewed from the right-hand end of the machine, by the engagemnt of a wear pin 56 with a wear plate 57. The wear pin 56 is mounted in the arm 44 adjacent the handle 48 and projects outwardly from the underside thereof to engage wear plate 57 which is mounted in a support block 58 fixed to the upper side of the headstock 12. The engagement of the pin 56 with the wear plate 57 limits the movement of the arm 44 toward the headstock and determines the active or working position of the tool carrier 20 and is preferably such that the weight of the arm 44 is not carried by the follower 43, the follower 43 being adjusted so that it properly meshes with the screw 42 when the pin 56 is riding on the wear plate 57.

Figure 3:
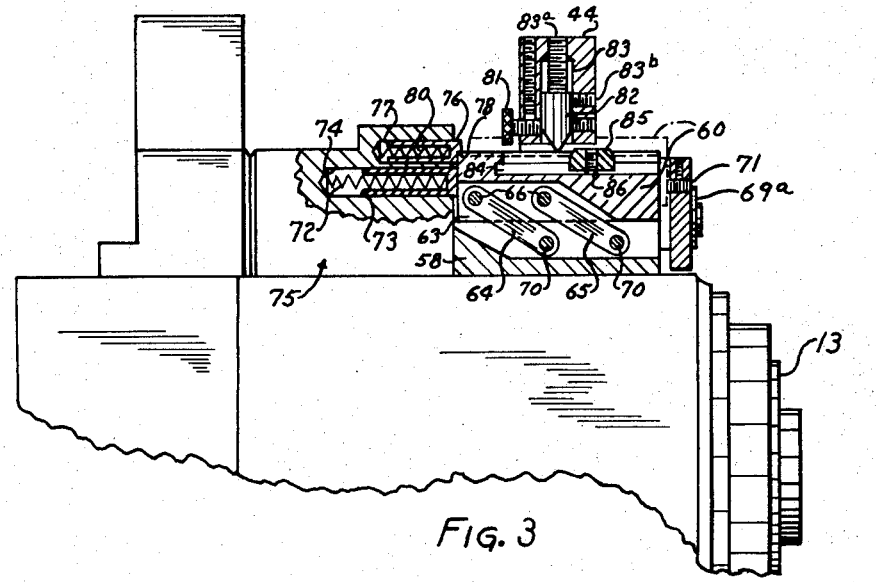
FIG. 3 is a fragmentary front elevational view of a portion of FIG. 2 with parts thereof cut away.

The support block 58, in addition to mounting the wear plate 57, also mounts a knock-off member 60 which is adapted to engage the underside of the arm 44 and lift the same a distance sufficient to disengage the follower 43 from the lead screw 42 to disconnect the feed drive to the carrier 20 and to allow the spring 52 to return the carrier 20 to its initial position with the collar 54 against the stop block 55. The knock-off member 60 is shown as comprising a member which is generally rectangular in section and which is received in a rectangular-shaped cutout 62 opening into the upper side of the support block 58. The knock-off member 60 has a recess 63 opening inwardly from the underside thereof and receiving the ends of a pair of parallel links 64, 65. The parallel links 64, 65 are received in the recess 63 and are pivoted to the knock-off member 60 by pins 66 which pass through the side walls of the recess 63. The other ends of the links 64, 65 are received in a recess 68 opening inwardly from the bottom of the cutout 62 and are pivoted to the support block 58 by pins 70 which extend between the side walls of the cutout 68. The links 64, 65 support the knock-off member 60 for parallel motion movement from an inner position in the cutout 62 and the support block 58 to a position extending outwardly thereof, as is shown in FIG. 1 and in dot-dash in FIG. 3. It will be noted that the cutout 62 opens into the right-hand end of the support block 58 as the latter is viewed in FIG. 3 to accommodate the necessary endwise movement of the knock-off member 60 as it is moved to its outer position. A stop block 69 is secured to the right-hand end of the support block 58 and has a portion 69a which is spaced from the right-hand end of the stop block 69 opposite to the end of the cutout 62 which is engaged by the knock-off member 60 to limit the movement of the latter when the latching member is released. Preferably, the knock-off member engages an adjustable stop screw 71 carried by the portion 69a.

The knock-off member 60 is spring biased outwardly of the support block 58 by a biasing spring 72 acting through a plunger 73 against the inner end of the knock-off member 60. The plunger 73 and spring 72 are supported within a bore 74 in a mounting block 75 adjacent the left-hand end of the support block 58, as the latter is viewed in FIG. 3, and the plunger 73 bears on the inner end, i.e. left-hand end, of the knock-off member 60, as the latter is viewed in FIG. 3, to urge the knock-off member 60 to the right. This bias will tend to swing the links 64, 65 clockwise about their pivot pins 70, as viewed in FIG. 3, to move the knock-off member 60 to the right and upwardly to the position shown in dot-dash lines. The knock-off member 60 may be moved to the position shown in FIG. 3 against the bias of the spring 72 by applying a depressing force to the knock-off member 60. The knock-off member 60 can be releasably held in the position shown in FIG. 3 against the bias of the spring 72 by a spring-biased latch member 76 which is supported in a bore 77 in the mounting block 75, which bore is above the bore 74. The plunger 76 has a lip 78 which is adapted to move over the top of the knock-off member 60 when the latter is moved to the position shown in FIG. 3 to prevent outward movement of the knock-off member. The plunger is biased toward engagement with the knock-off member 60 by a spring 80 disposed within the plunger and abutting the bottom of the plunger bore 77. It can be seen that by moving the plunger 76 inwardly against the bias of the spring 80, the lip 78 will clear the knock-off member 60 and allow the spring 72 acting through the plunger 73 to raise the knock-off member 60. Conversely, when the knock-off member 60 is depressed, its inner end will engage the latching member 76 and push it inwardly against the action of its biasing spring 80 until it reaches a position where the lip 78 slips over the top of the knock-off member. At this time the biasing spring 72 cannot act to move the knock-off member 60 outwardly until the latching member 76 is depressed.

The latching member 76 is actuated to release the knock-off member by the head of a screw 81 threaded into the arm 44 for movement therewith. As the carrier reaches the end of its work pass, the head of screw 81 strikes the member 76 and depresses the latter to effect a release of the knock-off member 60.

The knock-off member 60 is disposed immediately below the arm 44 when the latter is in its working position and when the arm 44 is moved to its working position, the knock-off member 60 is engaged by a pin 82 to depress the knock-off member 60 and move it to a position where the latch 76 may move outwardly to its latching position. The pin 82 is preferably adjustably mounted on a bore 83 in the arm 44. To adjust the pin, an adjusting screw 83a, which threads through the bottom of the bore 83 into engagement with the top of pin 82, is rotated. After adjustment, the pin 82 is locked against movement by suitable setscrews 83b. In the preferred and illustrated embodiment, the top of the knock-off member 60 is provided with a T-shaped slot 84 which slidably receives a T-shaped dog 85. The dog 85 extends above the top of the knock-off member 60 and can be locked in a selected position with a screw 86 which threads into and through the T-shaped dog 85 and bears against the bottom of the slot 84. The screw 86 is countersunk and by turning the screw, the dog 85 may be raised to clamp it against the top of slot 84.

Figure 2:
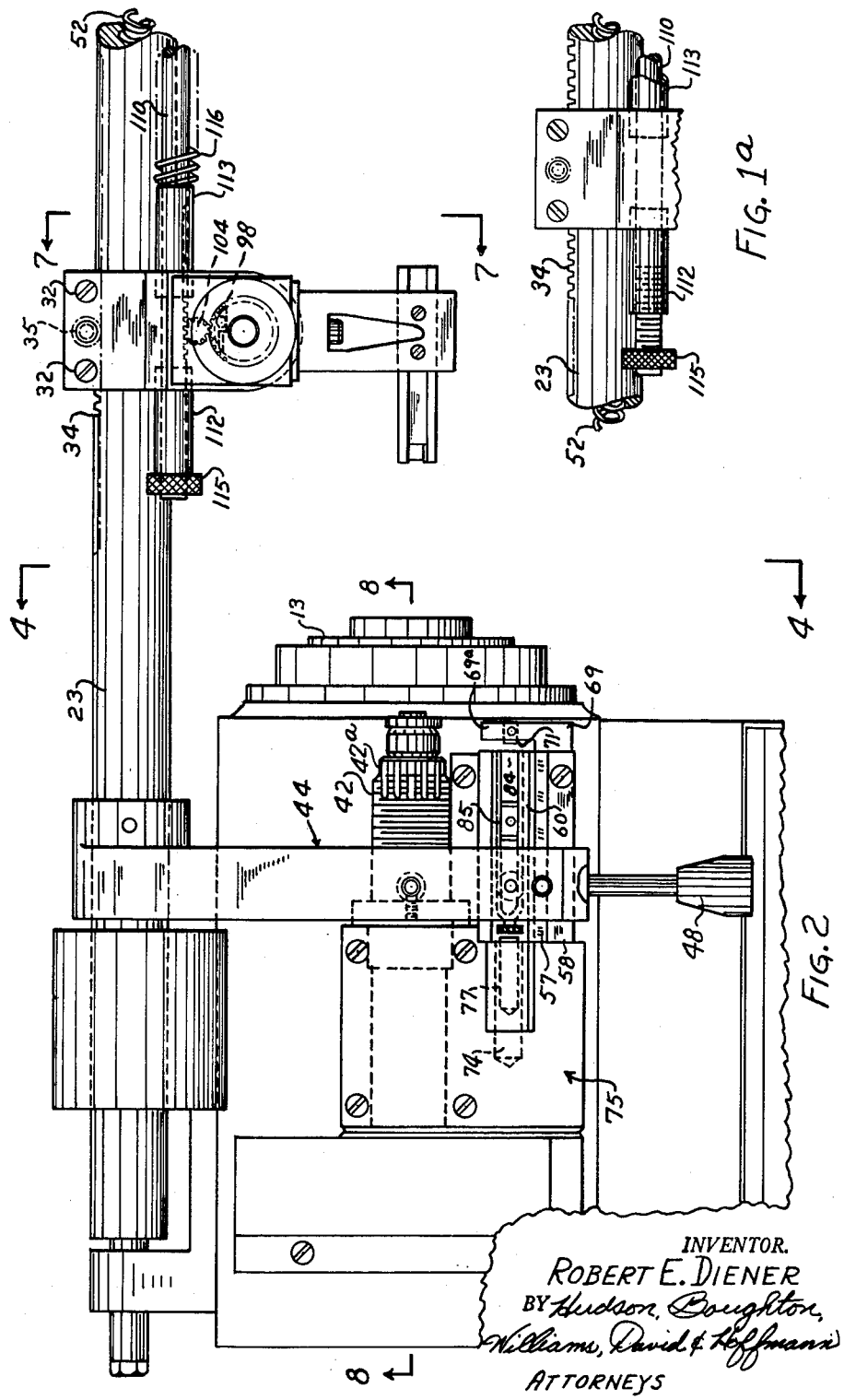
FIG. 2 is a fragmentary plan view of the lathe shown in FIG. 1 looking at the left-hand part of the lathe as viewed in FIG. 1, but showing parts displaced from their position in FIG. 1.

The T-shaped dog 85 is disposed adjacent the right-hand end of the knock-off member 60, as the latter is viewed in FIG. 2, and in position to be engaged by the pin 82 when the arm 44 is moved to its active position to initiate a work pass. The additional height provided by the dog 85 will allow the pin 82 to depress the knock-off member 60 below the level at which the lip 78 for the latching member 76 moves over the top of the latch block to assure that the latching member 76 moves to latching position and when the pin 82 rides off the dog 85 during the work pass, the upward movement of the knock-off member 60 will be limited by the lip 78. The pin 82, after riding off the dog 85, is clear of knock-off member 60 and preferably there is a little clearance between the top of the knock-off member 60 and the arm 44. It should be noted that the dog 85 can be adjusted along the T-shaped slot 84 to position the dog in various positions so that it can be engaged and depressed by the pin 82 in various positions of carrier 20.

In the illustrated embodiment, the knock-off member 60 also functions as a support and guide to hold the arm 44 and, in turn, the tool T in a nonworking position during the return of the carrier 20 to its initial position wherein the collar 54 abuts the stop block 55. When the carrier 20 is in its initial position, the pin 82 will be in engagement with the top of dog 85 and when the arm 44 is next depressed to move the tool T to its working position, the knock-off member will be moved downwardly sufficiently to allow the latch member 76 to engage and hold the knock-off member in its inactive position.

The working position of tool T, i.e. the depth of cut by the tool T, is varied by adjusting the tool slide 21 on the block 28. In a preferred and illustrated embodiment, the tool slide 21 is adjusted by rotating a lead screw 90 which extends parallel to the ways 28a and outwardly of the block 28 at one side thereof. The outer end of the lead screw 90 is in the form of a shank or shaft 91 and the outermost end thereof has fixed thereto a knob 92 for manually effecting rotation of the screw to set the tool slide 21. The lead screw 90 may also be rotated through a one-way clutch mechanism 95 disposed on the shank 91 inwardly of the knob 92. The one-way clutch mechanism 95 includes spaced clutch elements 96a, 96b keyed to the shank 91 and a driving clutch element 97 disposed between the elements 96a, 96b and rotatable relative to the shank 91. The clutch elements 96a, 96b and 97 have friction drive surfaces on their adjacent sides so that the clutch elements 96a, 96b are rotated upon rotation of the drive element 97.

The driving clutch element 97 is disposed within a drive gear 98 and a one-way drive connection is provided between the gear 98 and the driving clutch element 97. This one-way drive connection is in the form of a roller 100 located in a cutout 101 in the periphery of the driving element 97. The cutout 101 has two sides 101a, 101b disposed at right angles to one another. The roller 100 is movable along the side 101a and when moved inwardly along the side, will clear the inside periphery of the drive gear 98 and when moved outwardly, will wedge between the drive gear 98 and the side 101b. The roller 100 is spring biased in a direction to move the ball 100 outwardly of the cutout 101 and into engagement with the inside periphery of the drive gear 98 by a spring 102. When the gear 98 is rotated in a clockwise direction, as viewed in FIG. 2, the rotation of the gear tends to move the roller in the same direction as the spring 102 and to wedge the roller between the side 101a of the cutout 101 and the drive gear to effect a rotation of the clutch element 97. When the drive gear 98 is rotated in the opposite direction, the roller 100 is moved inwardly against the action of the spring 102 so that the roller is positioned at a point where the ball is effectively clear of the drive gear 98 and no drive is effected between the drive gear 98 and the driving clutch element. The one-way drive connection has not been described in considerable detail since the connections per se are well known to those skilled in the art.

The drive gear 98 meshes with and is driven by a pinion gear 104 formed on one end of a shaft 105 which has a second pinion gear 108 formed on the other end thereof. The shaft 105 is rotatably supported on the block 28 and extends parallel to the lead screw 90, and the pinion gear 108 thereon meshes with a rack bar 110 slidably received in an opening 111 in the block 28. The rack bar 110 extends parallel to the axis of the spindle 13 and to the bar 23 and extends outwardly of opposite sides of the way block 28 and through bushings 112, 113 fixed to the opposite sides of the block. The bushing 112 is fixed to the block 28 on the headstock side of the block, while the bushing 113 is fixed to the way block on the side thereof toward the arm 25. The rack bar 110 has a portion which extends outwardly of the end of bushing 112 and is threaded to receive a stop nut 115 to limit the movement of the rack bar to the right, as the latter is viewed in FIGS. 1 and 2. The rack bar 110 is urged to the right, as viewed in FIGS. 1 and 2, by a spring 116 interposed between the bushing 113 and a collar 118 fixed to the end of the bar 110 that extends outwardly of the bushing 113 toward the arm 25. The right-hand end of the rack bar, as viewed in FIG. 5, i.e. the end extending toward the arm 25, is bored to provide an opening 120 for receiving a pilot rod 121. The pilot rod 121 extends from the outer end of the rack bar 110 through the collar 118 and an opening in the collar 54 and is connected to the rack bar 110 for movement therewith by a setscrew in the collar 118. The rod is urged by the spring 116 toward engagement with the inner side of the arm 25 and will engage a stop block 55 adjacent the inner side of boss 39 unless prevented from doing so by the engagement of the stop nut 115 on rack bar 110 with the end of the bushing 112. The length of the rod 121, the rack bar 110, and the position of the nut 115 is such that when the carrier 20 is in its right-hand position with the collar 54 against the stop block 55 the rack bar 110 extends beyond the outer end of bushing 112, as is shown in FIG. 1A. As the carrier 20 is moved to the left, upon engagement of the follower 43 with the lead screw 42, the spring 116 will maintain engagement of the end of rod 121 with the stop block 55 and the rack bar 110 will move relative to the pinion gear 108 to rotate the shaft 105. The rotation of the shaft 105 is, however, in the direction which will rotate the drive gear 98 in its idling direction and the motion of the shaft 105 will not be transmitted to the lead screw 90. This relative movement between the rack bar 110 and the carrier 20 will continue with the movement of the carrier until the end of the bushing 112 engages the stop nut 115, as is shown in FIG. 2, at which time the rack bar 110 will be moved with the carrier 20. After the work pass is completed and upon the return movement of the carrier 20, the rack bar 110 will move with the carrier until the end of the rod 121 engages the stop block 55 adjacent the arm 25, at which time the rack bar 110 will be held against movement with the carrier and the continued movement of the carrier 20 will cause the pinion 108 to rotate, to rotate the shaft 105 and, in turn, the drive gear 98. This time the rotation is in a direction which is transmitted to the lead screw 90 to advance the tool slide 21 toward the axis of the spindle. It can be seen that the amount of rotation of the shaft 105 during the return movement of the carrier 20 is determined by the position of the stop nut 115 since this is what controls the distance that the rack bar 110 and rod 121 extend from the block 28 toward the arm 25 at which the rod 121 will engage the stop block 55. Accordingly, the amount of advance of the slide 21 may be adjusted by adjusting the position of the stop nut 115. A further adjustment may be accomplished by adjusting the length of the rod 121 which extends from the right-hand end of the rack bar 110, as viewed in FIGS. 1 and 5.

Figure 8:
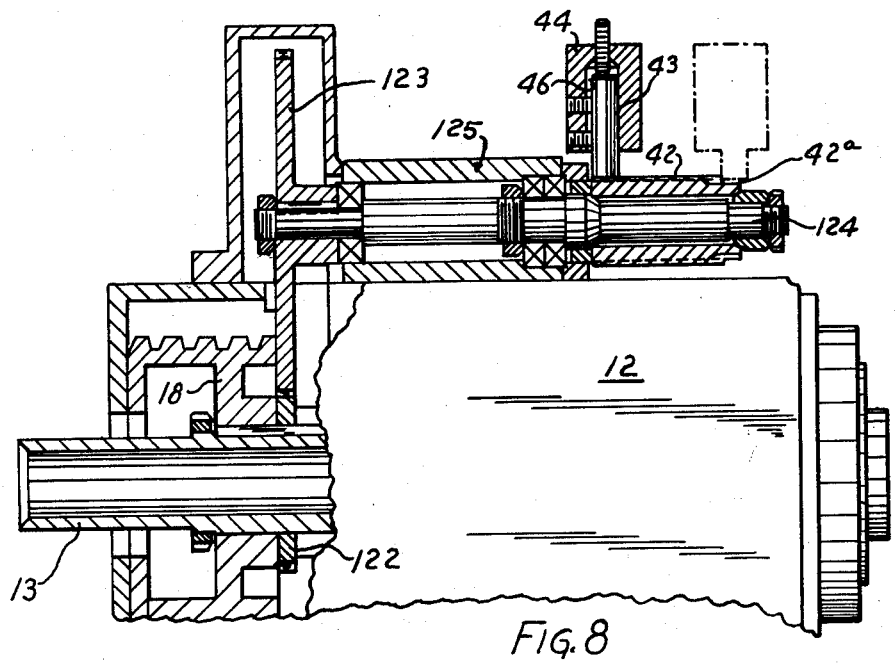
FIG. 8 is a sectional view taken approximately along line 8—8 of FIG. 2 looking in the direction of the arrows and with portions cut away.

As has been described, the rotation of the lead screw 42 effects the advance movement of the carriage through its work pass when the follower 43 is engaged with the lead screw. The follower 43 comprises a barlike piece of metal having an end which forms the follower and the screw 42 is, preferably, as is shown in FIG. 8, provided with a hob portion 42a adjacent its right-hand end. The hob portion is designed to cut threads in the follower 43 which are adapted to mate with the threads on the lead screw 42.

When the collar 54 abuts the stop block 55, the follower 43 is positioned to the left of the hob portion as viewed in FIG. 2. To allow the follower 43 to engage the hob portion, the stop block is supported by a pin 55a which is rotatable in the boss 39, for swinging movement to a position clear of collar 54 and rod 121 to allow the collar 54 to move into engagement with the boss 39 and position the follower 43 adjacent the right-hand end of the hob portion 42a. With the parts so positioned, the follower 43 will engage the hob portion 42a when the tool T is moved to working position.

The lead screw 42 is rotated from the spindle 13, as is shown in FIG. 8. Referring to FIG. 8, it will be seen that, in the illustrated embodiment, the lead screw 42 is fixed to a shaft 124 journaled in support structure 125 fixed to the top of the headstock 12 and the left-hand end of the shaft 124 has a gear 123 thereon which meshes with a gear 122 fixed to the spindle 13 for rotation therewith. The screw 42 is, therefore, rotated in timed relationship to the rotation of the spindle 13.

It can now be seen that the present invention provides a machine wherein the tool carrier 20 is movable in a first plane, i.e. a plane perpendicular to the axis of the spindle 13, to move the carrier to and from a working position wherein the tool T is adapted to perform a machining operation of the workpiece W as the carrier 20 is advanced parallel to the axis. The movement of the carrier 20 to a working position effects the engagement of the follower 43 with the lead screw 42, the lead screw 42 and the follower 43 constituting power transmission elements of a drive for effecting the advance of the carrier 20 through a work pass. As the carrier 20 moves through its work pass with the follower 43 in engagement with the lead screw 42, the spring 52 yields and is further compressed by the movement and after a predetermined advance of the carrier 20, the latching member 76 is engaged by a screw 81 on the arm 44 to depress the latching member and release the knock-off member 60 for vertical movement under the action of the biasing spring 72. The movement of the knock-off member 60 lifts the arm 44 sufficiently to disengage the follower 43 from the lead screw 42 to stop the advance movement of the carrier 20 and to move the carrier away from its working position, and the knock-off member 60 will provide a support along which the arm 44 rides as the carrier 20 is returned to an initial position adjacent the beginning of the work stroke by the spring 52. As the carrier 20 moves in its return stroke with the carrier in a nonworking position and the tool T disengaged from the workpiece, the lead end of the rod 121 will engage the adjacent side of the block 55 to hold the rack bar 103 against movement with the carrier 20 and continued movement of the carrier 20 will cause rotation of the pinion gear 108 formed on the end of shaft 105 to advance the tool T as the carrier 20 is returned to its initial position. The next work pass is then initiated by depressing the arm 44 to move the tool T to working position and the follower 43 into engagement with lead screw 42. This movement of the arm 44 also causes the movement of knock-off member 60 to its inactive position where it is latched by the latching member 76.

It should be noted that when the knob 92 is rotated in a direction to retract the tool slide, the roller 100 will wedge against the inner periphery of the gear 98 to hold the driving disk 97 against rotation. The frictional surfaces, however, between the disks 96a, 96b and the driving element 97 will slip to allow the lead screw to be rotated even though the driving element 97 is held against rotation. Preferably, the movement of the tool slide 21 toward the work is limited by a stop screw 130 carried by the block 28 and engageable with a dog 131 fixed to the slide 21 to limit the advance of the slide. The frictional surfaces interconnecting the driving element 97 and the driven elements 96a, 96b will provide slippage in the event the shaft 105 is rotated after the dog 131 engages the end of the stop screw 130.

While the preferred embodiment of the present invention has been described in considerable detail, it is hereby my intention to cover all modifications, constructions, and arrangements which fall within the ability of those skilled in the art and within the scope and spirit of the present invention.

Having described my invention, what I claim is:

1. In a machine, first and second support members relatively movable in a first plane to and from a first position wherein said members are to be moved relatively parallel to each other in a first direction, drive means to effect said relative movement in said first direction comprising first and second cooperating drive elements engageable with each other and relatively movable in said first plane from an engaged position to a position clear of driving relationship with each other to stop said relative movement in said first direction, means interconnecting said elements and members to move said elements to engage and disengage said drive means in response to relative movement between said members to and from said first position including means connecting one of said elements to said second support member to drive the latter when said drive elements are engaged, a part fixed to said second support member and movable therewith, a knock-off member movably supported by said first support member and having an inactive position when said support members are in said first position and movable therefrom relative to said first support member toward said part fixed to said second support member and to a second position and engageable with said part to relatively move said support members from their said first position to disengage said elements upon movement of said knock-off member from its inactive position to its second position, biasing means operatively connected to said knock-off member and urging said knock-off member to its said second position, and means for selectively and releasably holding said knock-off member in its said inactive position.

2. In a machine, the structure as defined in claim 1 and further comprising means responsive to the relative movement of said members in their said first direction to a predetermined relative position to effect the release of said means for releasably holding the knock-off member in its said inactive position.

3. In a machine, the structure as defined in claim 1 wherein said means for selectively and releasably holding said knock-off member in its said inactive position comprises latch means operated in response to the relative movement of said support members to their said first position to latch said knock-off member in its said inactive position.

4. In a machine having a movable member, a support member therefor, means mounting said movable member on said support member for reciprocatory movement parallel to a first path and for reciprocatory movement transversely of said path to and from a working position, a tool block mounted on said movable member, a tool slide supported on said tool block for movement transversely of said movable member, a lead screw having an axis parallel to said first path and a cooperating follower for effecting movement of said movable member along said first path when in its working position, said lead screw and follower being separable by relative movement transversely of the axis of said screw, means connected to said screw for rotating the screw, and means connecting one of said screw and follower to said movable member to effect movement of said movable member along said first path upon rotation of said screw and for movement therewith transversely of said path to effect engagement and disengagement of said follower and screw upon movement of said movable member to and from its working position, said movable member being biased to its said working position when in its working position, a knock-off member movably supported on one of said movable and support members and engageable with the other of said movable and support members and movable from a first position to a second position to move said movable member from its working position and to disengage said follower and lead screw, means biasing said knock-off member to its said second position, latching means cooperating with said knock-off member for releasably holding said knock-off member in its said first position, said knock-off member including a part engageable by said movable member on movement to its said working position to move said knock-off member to its said first position and said latching means including a spring-biased latching element engageable with said knock-off member when the latter is in its said first position to hold the latter against the action of said biasing means urging the knock-off member to its second position, biasing motor means opposing movement of said movable member by said screw and effective upon separation of said follower and screw to actuate said movable member in a return direction along said first path opposite to the direction of movement by said screw, and a stationary abutment means limiting the movement of said movable member by said biasing motor means to a predetermined position, a rack bar movably supported by said tool block and engageable with said stationary abutment means in advance of said tool block and displaced thereby relative to said tool block as said tool block thereafter is carried by the movable member in a return direction to said predetermined position, biasing means operatively connected between said tool block and said rack bar and urging said rack bar toward engagement with said abutment means, means on said tool block and said rack bar limiting the movement of said bar by the biasing means acting thereon, and means responsive to the movement of said rack bar relative to said tool block to advance said tool slide transversely relative to the movable member toward said path comprising a one-way clutch actuated in its driving direction by movement of said rack bar in one direction and idling when operated in its opposite direction.

5. In a machine, a movable member, a support member, means mounting said movable member on said support member comprising a shaft fixed to said movable member and bearing means connected to said support member and supporting said shaft for axial and rotational movement, said movable member being rocked to and from a working position on oscillation of said shaft, drive means for moving said movable member along a first path parallel to the length of said shaft comprising a lead screw extending parallel to said shaft and a cooperating lead screw follower, said follower and lead screw being disengageable by relative movement transversely of the screw, means connecting one of said follower and lead screw to said movable member for movement therewith as a unit and for engagement with and disengagement from the other on rocking movement of said movable member to and from its working position, respectively, spring means acting on said shaft and urging said shaft endwise in a direction to oppose movement by said lead screw and to urge said movable member to an initial position, said movable member being biased in a direction to move said lead screw and follower toward each other when said movable member is in working position, a knock-off member supported by one of said movable and support members, said knock-off member and its supporting member being relatively movable from a first relative position to a second relative position to effect disengagement of said lead screw and follower, biasing means acting between said knock-off member and its supporting member for biasing said knock-off member and its supporting member apart and to their said second relative position during at least the end portion of said movement along said first path and effecting movement of said knock-off member and its supporting member to their said second relative position, means on the other of said support and movable members for overcoming and charging said biasing means and positioning said knock-off member and its supporting member in their said first relative position on movement of said movable member, latching means for rendering said biasing means ineffective, and means effecting release of said latching means at the end of said movement along said first path to effect relative movement of said knock-off member and its support member to their said second relative position effecting disengagement of said lead screw and follower.

6. In a machine, the structure as defined in claim 5 wherein said connecting means comprises an arm fixed to said shaft and extending transversely thereof, the one of said lead screw and follower on said movable member being carried by said arm and said knock-off member being movably supported adjacent said arm and engageable therewith when released to rock said movable member from its said working position.

7. In a machine, the structure as defined in claim 6 wherein said knock-off member extends for substantially the extent of movement of said arm by said lead screw and follower and provides a support for holding said movable member out of working position during the return movement opposite to the direction of movement of said movable member by said lead screw.

8. In a machine tool having a frame, a movable member, means supporting said movable member on said frame for movement relative thereto, a tool block supported on said movable member, a tool slide supported on said tool block for movement transversely of said movable member, a rod extending parallel to said movable member, means mounting said rod on said tool block for axial movement relative to said movable member, spring means connected between said rod and tool block for urging said rod axially in one direction, cooperating abutment means on said tool block and said rod limiting the movement of said rod in said one direction, stationary abutment means on said frame adjacent said movable member and engaged by said rod as said movable member is moved in said one direction to displace said rod relative to said movable member, a rack on said rod, a pinion meshing with said rack, and drive means operatively connecting said pinion to drive said slide comprising a one-way clutch.

9. In a machine tool having a frame, a movable member, means supporting said movable member on said frame for movement relative thereto, a tool block supported on said movable member, a tool slide supported on said tool block for moveemnt transversely of said movable member, a rod extending parallel to said movable member, means mounting said rod on said tool block for axial movement relative to said movable member, spring means connected between said rod and tool block for urging said rod axially in one direction, cooperating abutment means on said tool block and said rod limiting the movement of said rod in said one direction, stationary abutment means on said frame adjacent said movable member and engaged by said rod as said movable member is moved in said one direction to displace said rod relative to said shaft, a rack on said rod, a pinion meshing with said rack, drive means operatively connecting said pinion to drive said slide comipirsing a lead screw rotatably supported on said tool block and operatively connected to drive said slide, said lead screw having a shank, a driving element rotatably supported on said shank, a driving element fixed to said shank for rotation therewith adjacent said driven element and frictionally engaging said driving element, and a one-way clutch mechanism connecting said pinion to drive said driving element and manual means on said movable member for rotating said screw independently of said driving element.

10. In a machine tool having a frame, a movable member, means supporting said movable member on said frame for axial movement relative thereto, a tool block supported on said movable member, a tool slide supported on said tool block for movement transversely of said movable member, a rod extending parallel to said movable member, means mounting said rod on said tool block for axial movement relative to said movable member, spring means connected between said rod and tool block for urging said rod axially in one direction, cooperating abutment means on said tool block and said rod limiting the movement of said rod in said one direction, stationary abutment means on said frame adjacent said movable member and engaged by said rod as said movable member is moved in said one direction to axially displace said rod relative to said movable member, a rack on said rod, a pinion meshing with said rack, and drive means operatively connecting said pinion to drive said slide comprising a rotatable lead screw having a shank, first means connected to said shank for rotating said shank in either direction selectively, second means for rotating said shank comprising an annular gear disposed coaxially about said shank, a driving disk rotatably supported on said shank within said gear, a one-way drive connection between said gear and said disk and a second disk fixed to said shank for rotation therewith adjacent said driving disk and frictionally engaging the latter.

11. In a machine tool having a frame, a movable member, means supporting said movable member on said frame for axial movement relative thereto, a tool block supported on said movable member, a tool slide supported on said tool block for movement transverseely of said movable member, a rod extending parallel to said movable member, means mounting said rod on said tool block for axial movement relative to said relative movement, spring means connected between said rod and tool block for urging said rod axially in one direction, cooperating abutment means on said tool block and said rod limiting the movement of said rod in said one direction, stationary abutment means on said frame adjacent said movable member and engaged by said rod as said movable member is moved in said one direction to axially displace said rod relative to said movable member, a rack on said rod, a pinion meshing with said rack, and drive means operatively connecting said pinion to drive said slide comprising a rotatable lead screw having a shank, first means connected to said shank for rotating said shank in either direction selectively, second means for rotating said shank comprising a driving element rotatably supported on said shank, a driven element fixed to said shank for rotation therewith adjacent said driving element and frictionally engaging said driving element, and drive means for selectively rotating said driving element and holding said driving element against rotation in at least one direction when inactive.

12. In a machine tool having a frame, a movable member, means supporting said movable member on said frame for axial movement relative thereto, a tool block supported on said movable member, a tool slide supported on said tool block for movement transversely of said movable member, a rack bar extending parallel to said movable member, means mounting said rack bar on said tool block for axial movement relative to said movable member, a rod connected coaxially with said rack bar at one end thereof for movement therewith, spring means connected between said rack bar and tool block for urging said rack bar and rod axially in one direction, cooperating abutment means on said tool block and said rack bar limiting the movement of said rack bar and rod in said one direction, stationary abutment means on said frame adjacent said movable member and engaged by said rod as said movable member is moved in said one direction to axially displace said rack bar and rod relative to said movable member, said rod also being adjustable in length with respect to said rack bar so as to limit the movement of said rack bar and said rod in said one direction, a pinion meshing with said rack bar, and drive means operatively connecting said pinion to drive said slide comprising a one-way drive clutch.

13. In a machine having a movable member, a support member therefor, means mounting said movable member on said support member for reciprocatory movement in a first path and for reciprocatory movement transversely of said first path to and from a working position, first and second drive elements operatively connected to said movable and support members for effecting movement of said movable member along said first path when in its working position and being separable by movement of said movable member from working position, means connecting one of said drive elements to said movable member to effect movement of said movable member along said first path and for movement therewith transveresly of said first path to effect engagement and disengagement of said drive elements upon movement of said movable member to and from its working position, said movable member being biased to its said working position when in its working position and during at least the initial portion of moveemnt along said first path, a knock-off member supported by one of said movable and support members, said knock-off member and its supporting member being relatively movable from a first relative position to a second relative position to effect disengagement of said drive elements, biasing means acting between said knock-off member and its supporting member for biasing said knock-off member and its supporting member apart and to their said second relative position during at least the end portion of said movement along said first path and effecting movement of said knock-off member and its supporting member to their said second relative position, means on the other of said support and movable members for overcoming and charging said biasing means and positioning said knock-off member and its supporting member in their said first relative position on one of said reciprocatory movements, latching means for rendering said biasing means ineffective, and means effecting release of said latching means at the end of said movement along said first path to effect relative movement of said knock-off member and its supporting member to their said second relative position effecting disengagement of said drive elements.

References Cited in the file of this patent

UNITED STATES PATENTS

| | | |
|---|---|---|
| 277,160 | Roberts | May 8, 1883 |
| 417,973 | Blackhall et al. | Dec. 4, 1889 |
| 782,220 | Coulter et al. | Feb. 14, 1905 |
| 2,381,849 | Varndell | Aug. 7, 1945 |